United States Patent
Imura et al.

(10) Patent No.: US 11,248,706 B2
(45) Date of Patent: Feb. 15, 2022

(54) SLIDING MEMBER

(71) Applicant: EAGLE INDUSTRY CO., LTD., Tokyo (JP)

(72) Inventors: Tadatsugu Imura, Tokyo (JP); Hideyuki Inoue, Tokyo (JP); Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 102 days.

(21) Appl. No.: 16/622,826

(22) PCT Filed: Jul. 4, 2018

(86) PCT No.: PCT/JP2018/025425
§ 371 (c)(1),
(2) Date: Dec. 13, 2019

(87) PCT Pub. No.: WO2019/009345
PCT Pub. Date: Jan. 10, 2019

(65) Prior Publication Data
US 2021/0048106 A1 Feb. 18, 2021

(30) Foreign Application Priority Data
Jul. 7, 2017 (JP) .............................. JP2017-133953

(51) Int. Cl.
*F16J 15/34* (2006.01)
*F16C 33/74* (2006.01)
*F16C 17/04* (2006.01)

(52) U.S. Cl.
CPC .......... *F16J 15/3412* (2013.01); *F16C 33/74* (2013.01); *F16C 17/04* (2013.01)

(58) Field of Classification Search
CPC .... F16J 15/00; F16J 15/16; F16J 15/34; F16J 15/3412; F16J 15/3424; F16J 15/3428;
(Continued)

(56) References Cited

U.S. PATENT DOCUMENTS 5,834,094 A * 11/1998 Etsion .................... F16C 33/103
428/156
6,902,168 B2 * 6/2005 Tejima ................. F16J 15/3424
277/399
(Continued)

FOREIGN PATENT DOCUMENTS

| JP | 2003343741 A | 12/2003 |
| JP | 2007092983 A | 4/2007 |

(Continued)

OTHER PUBLICATIONS

International Search Report (ISR) dated Sep. 25, 2018, issued for International application No. PCT/JP2018/025425. (1 page).

*Primary Examiner* — Nathan Cumar
(74) *Attorney, Agent, or Firm* — Law Office of Katsuhiro Arai

(57) ABSTRACT

In a pair of sliding components having respective sliding faces (S) which slide relative to each other, at least one of the sliding faces (S) is provided with a plurality of dimples (10), and the dimples (10) include a concave part (15), and a peripheral edge part (11) which is located at the outer peripheral part of the concave part (15) and is shallower than the concave part (15). Accordingly, the performance of the plurality of dimples formed on the sliding face can be sufficiently exploited, thereby improving their lubrication performance and sealing performance.

13 Claims, 7 Drawing Sheets

SECTION A-A

PORTION D

(58) Field of Classification Search
CPC .......... F16C 33/00; F16C 33/72; F16C 33/74;
F16C 33/741; F16C 33/743; F16C
33/745; F16C 17/00; F16C 17/04; F16C
17/045; F16C 17/047
USPC ........................................................ 277/400
See application file for complete search history.

(56) References Cited

U.S. PATENT DOCUMENTS

| 8,814,433 | B2* | 8/2014 | Tokunaga | ............. | F16C 17/045 |
| | | | | | 384/123 |
| 9,169,931 | B2* | 10/2015 | Tokunaga | ............. | F16J 15/3412 |
| 2014/0294331 | A1* | 10/2014 | Tokunaga | ............. | F01D 25/168 |
| | | | | | 384/123 |

FOREIGN PATENT DOCUMENTS

| JP | 2010133496 A | 6/2010 |
| JP | 2011185292 A | 9/2011 |
| JP | 5518527 B2 | 6/2014 |

* cited by examiner

SECTION A-A

PORTION B

SECTION A-A

PORTION C

SECTION A-A

PORTION D (a)

PORTION C (b)

PORTION D

SLIDING MEMBER

CROSS-REFERENCE TO RELATED APPLICATIONS

This application is the U.S. National Phase under 35 U.S.C. § 371 of International Application PCT/JP2018/025425, filed Jul. 4, 2018, which claims priority to Japanese Patent Application No. JP2017-133953, filed Jul. 7, 2017. The International Application was published under PCT Article 21(2) in a language other than English.

TECHNICAL FIELD

The present invention relates to a sliding component suitable for, for example, mechanical seals, slide bearings, and other sliding parts. In particular, the present invention relates to a sliding component such as a seal ring or a bearing for reducing friction by interposing a fluid between sliding faces and for preventing leakage of the fluid from the sliding faces.

BACKGROUND ART

Frequently, a concave part referred to as a dimple is provided on a sliding part such as a mechanical seal, thereby improving lubrication performance and sealing performance (Patent Document 1, Patent Document 2).

CITATION LIST

Patent Documents

Patent Document 1: JP2003-343741 A
Patent Document 2: JP 5518527 B

SUMMARY OF THE INVENTION

Problem to be Solved by the Invention

Recently, natural refrigerant such as $CO_2$ is becoming popular as non-fluorocarbon refrigerant. However, the working pressure of such natural refrigerant is very high, seizure or the like is generated in a mechanical seal provided with a conventional dimple, and in some cases, sufficient sealing performance cannot be exhibited.

The present invention has been made in view of such a problem, and an object thereof is to provide a sliding component with which the performance of a plurality of dimples formed on a sliding face can be sufficiently exploited, thus whose lubrication performance and sealing performance are improved.

Means for Solving Problem

To attain the above object, according to a first aspect of the present invention, a pair of sliding components having respective sliding faces which slide relative to each other, and the sliding components are characterized in that:

at least one of the sliding faces is provided with a plurality of dimples; and the dimples include a concave part, and a peripheral edge part which is located at the outer peripheral part of the concave part and is shallower than the concave part.

According to the first aspect, high pressure is generated in the shallow peripheral edge part of the outer peripheral part of the concave part, and fluid lubrication effect and sealing effect by the concave part are further improved, thereby capable of providing the sliding components excellent in sealing performance and lubrication performance.

The sliding component according to a second aspect of the present invention is characterized in that the peripheral edge part includes an inclined wall part which ranges to the sliding face and has a gradient smaller than a wall part of the concave part.

According to the second aspect, by generating higher pressure using a wedge part formed by the inclined wall part of the outer peripheral part of the concave part, fluid lubrication effect and the sealing effect of the dimples can be enhanced.

The sliding component according to a third aspect of the present invention is characterized in that the inclined wall part includes a curved surface in at least a part thereof.

According to the third aspect, it is possible to form an extremely small gradient by using the curved surface.

The sliding component according a fourth aspect of the present invention is characterized in that the gradient of the peripheral edge part is $1/100$ or less.

According to the fourth aspect, the peripheral edge part can constantly form the wedge part having a small gradient, thereby capable of certainly generating high pressure.

The sliding component according to a fifth aspect of the present invention is characterized in that the peripheral edge part includes a Rayleigh step or a reverse Rayleigh step.

According to the fifth aspect, a fluid is suctioned by the reverse Rayleigh step, or high pressure is generated by the Rayleigh step, thereby capable of enhancing fluid lubrication effect and the sealing effect of the dimples.

The sliding component according to a sixth aspect of the present invention is characterized in that when the depth of the concave part is G and the opening diameter of the concave part in the sliding face is D, a ratio G/D of the depth and the opening diameter is 0.25 to 1.

According to the sixth aspect, it is possible to form a fluid film at the peripheral edge part by supplying the fluid stored in the concave part to the peripheral edge part.

The sliding component according to a seventh aspect of the present invention is characterized in that when the width of the peripheral edge part is E, a ratio E/D of the width and the opening diameter is 0.15 to 0.5.

According to the seventh aspect, it is possible to increase a load capacity by increasing the area of the peripheral edge part where high pressure is generated.

The sliding component according to an eighth aspect of the present invention is characterized in that the depth G of the concave part is 5 µm to 50 µm.

According to the eighth aspect, it is possible to form a high pressure fluid film at the peripheral edge part by sufficiently supplying the fluid stored in the concave part to the peripheral edge part.

DESCRIPTION OF EMBODIMENTS

Modes for carrying out the present invention will be described illustratively based on embodiments. However, the dimensions, materials, shapes, relative arrangements, and others of components described in the embodiments are not intended to limit the scope of the present invention only to them unless otherwise described explicitly.

First Embodiment

Referring to FIG. 1 to FIG. 4, a sliding component according to a first embodiment of the present invention will be described. In addition, in the following embodiment, a mechanical seal which is an example of the sliding component will be described as an example, but the present invention is not limited thereto, and for example, can also be used as a sliding component of a bearing which slides with a rotating shaft while sealing a lubricating oil on an axial one side of a cylindrical sliding face. In addition, the outer peripheral side of sliding component constituting the mechanical seal is described as a high pressure fluid side (sealed fluid side) and the inner peripheral side is described as a low pressure fluid side (leakage side).

Figure 1:
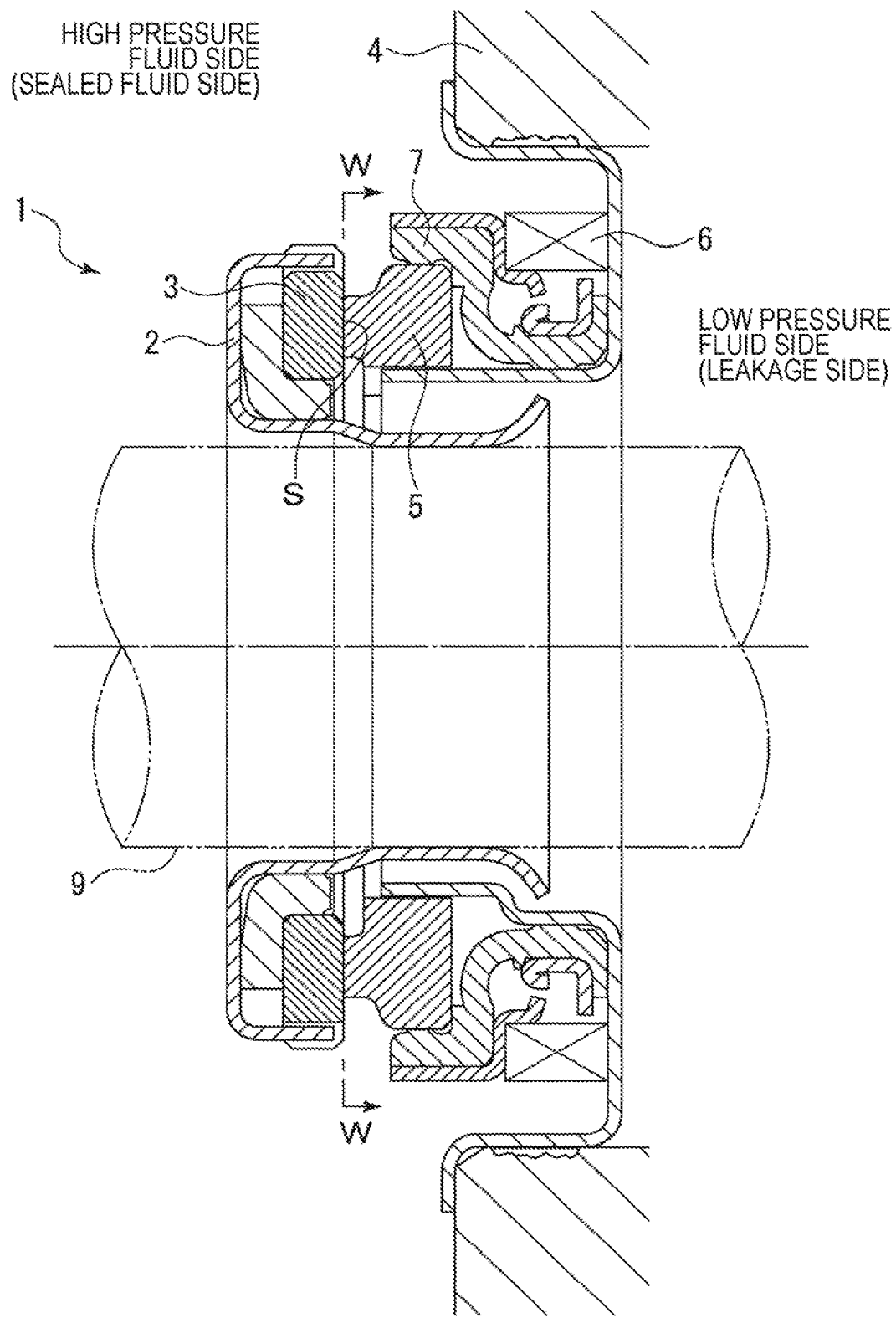
FIG. 1 is a vertical sectional view showing an example of a mechanical seal applying a sliding component according to the present invention.

FIG. 1 is a vertical sectional view showing an example of a mechanical seal 1, which is an inside mechanical seal in a form of sealing a sealed fluid on the high pressure fluid side tending to leak from the outer periphery of a sliding face toward the inner periphery. The mechanical seal is provided, on the side of a rotating shaft 9 which drives a pump impeller (not shown) on the high pressure fluid side, with a rotating-side seal ring 3 in an annular shape which is one sliding component provided in a state of being integrally rotatable with the rotating shaft 9 via a sleeve 2, and at a housing 4 of a pump, with a stationary-side seal ring 5 in an annular shape which is the other sliding component provided in a state of being non-rotatable and axially movable. By a coiled wave spring 6 and a bellows 7 which axially bias the stationary-side seal ring 5, sliding faces S slide in close contact with each other. That is, the mechanical seal prevents a sealed fluid from flowing out from the outer peripheral side of rotating shaft 9 to the inner peripheral side at each other's sliding faces S of the rotating-side seal ring 3 and the stationary-side seal ring 5. In addition, in FIG. 1, a case where the width of the sliding face of the rotating-side seal ring 3 is wider than the width of the sliding face of the stationary-side seal ring 5 is shown, but the present invention is not limited thereto, and of course can be applied to the opposite case.

Although the materials of the rotating-side seal ring 3 and the stationary-side seal ring 5 are selected from silicon carbide (SiC) excellent in wear resistance, carbon excellent in self-lubricity and the like, for example, both may be SiC or combinations of SiC as the rotating-side seal ring 3 and carbon as the stationary-side seal ring 5 are possible. In at least either one of sliding faces which slide relative to each other of the rotating-side seal ring 3 and the stationary-side seal ring 5, dimples are arranged.

In the present invention, the "dimple" means a dent having an opening part surrounded by the flat sliding faces S (land parts) and having a bottom recessed from the sliding faces S, and the shape thereof is not particularly limited. For example, the shape of the opening part of the dent includes a circle, a triangle, an ellipse, an oval or a rectangle, and the sectional shape of the dent includes various shapes such as a cone, a truncated cone, a semicircle, a bowl or a square.

In this example, a case where a plurality of dimples are arranged in the sliding face S of the stationary-side seal ring 5 will be described. In this case, the rotating-side seal ring 3 may or may not be provided with dimples. In addition, a plurality of dimples may be regularly arranged in the sliding face S and formed as an aligned dimple group, or may be irregularly arranged and formed as a random dimple group, or further may be arranged by a combination of an aligned dimple group and a random dimple group.

Figure 2:
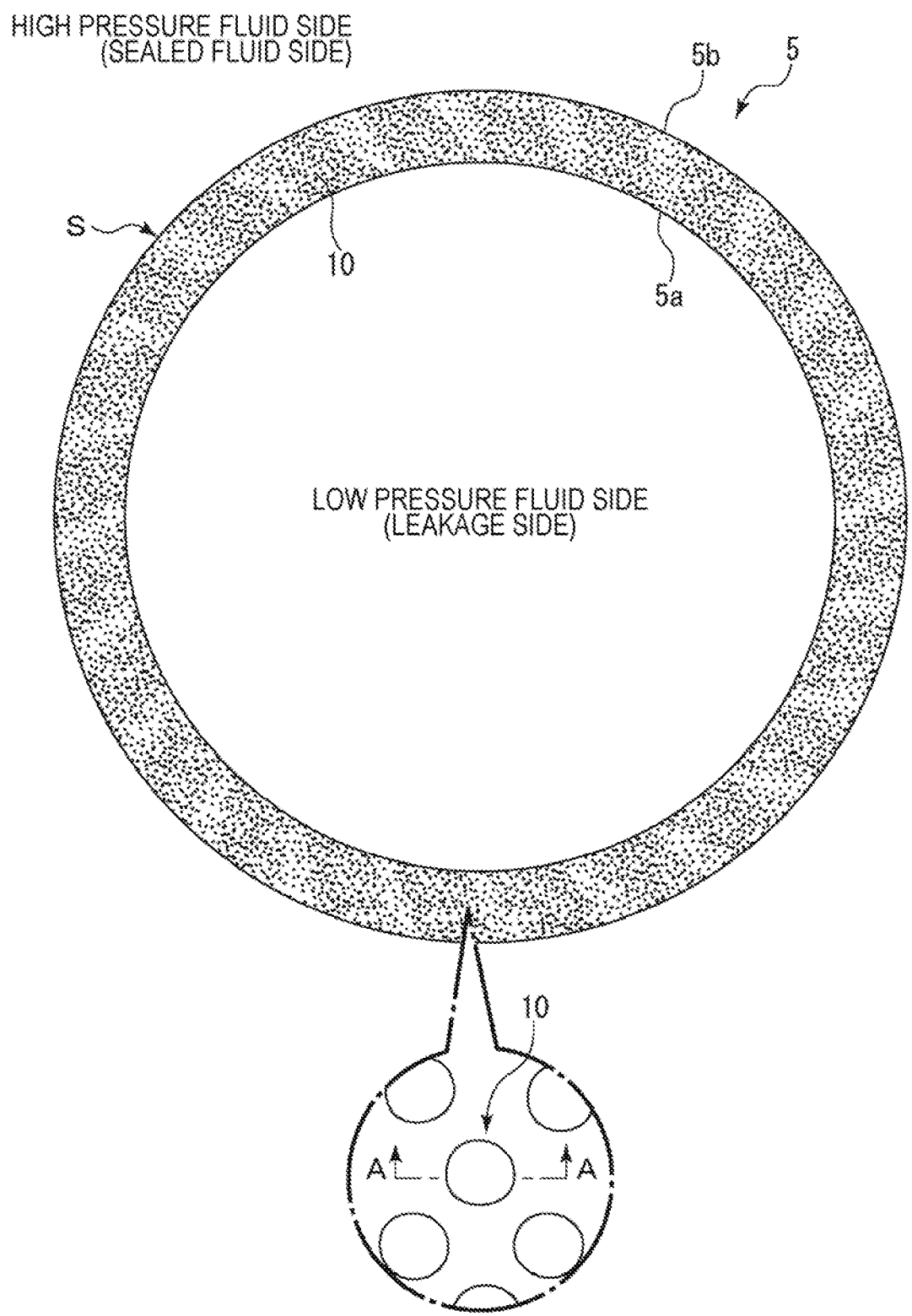
FIG. 2 is a view on arrow W-W in FIG. 1 and shows an example of a sliding face of the sliding component according to a first embodiment of the present invention.

As shown in FIG. 2, in an almost whole surface of the sliding face S of the stationary-side seal ring 5, a plurality of dimples 10 having a generally circular opening part are arranged.

Figure 3:
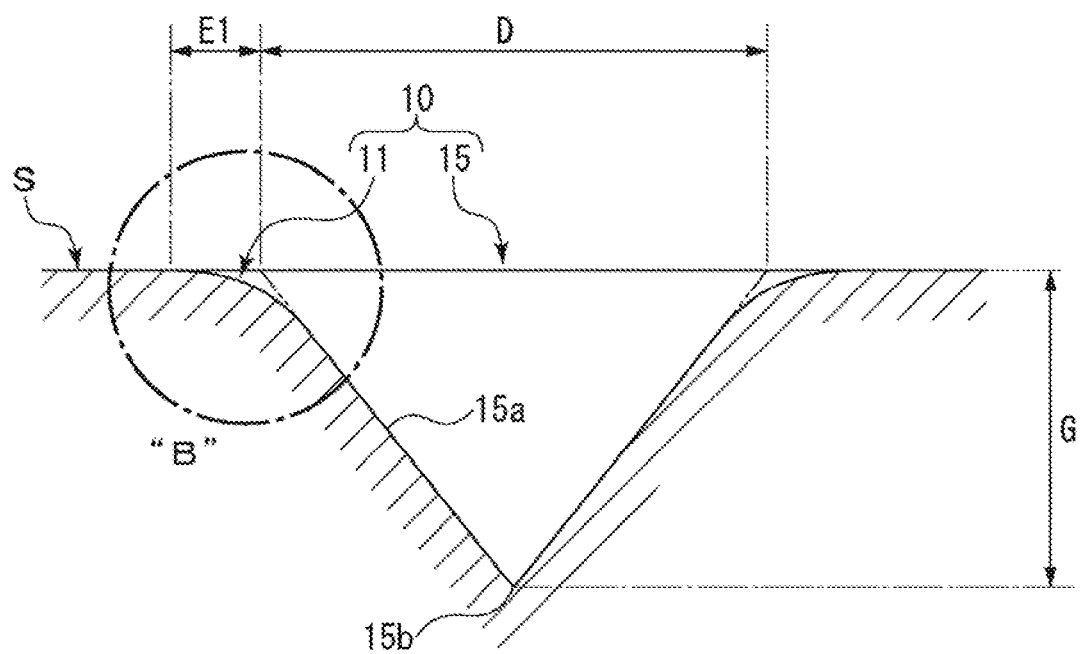
FIG. 3 shows a section A-A in FIG. 2 and shows a sectional shape of a dimple according to the first embodiment of the present invention.
Figure 3:
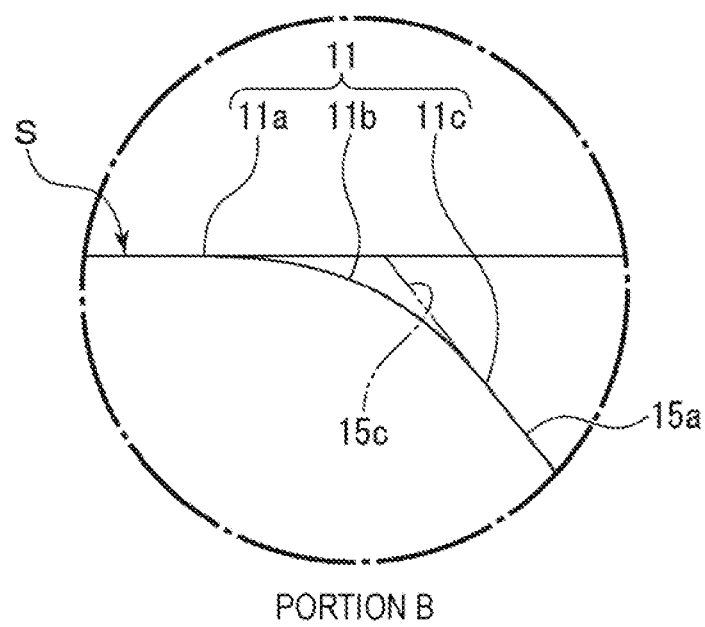

As shown in FIG. 3, the dimple 10 mainly consists of a concave part 15 whose sectional shape is a cone, and a peripheral edge part 11 which ranges to an outer peripheral part of a wall part 15a of the concave part 15 and grows wider in a trumpet shape. The concave part 15 has a bottom 15b having a depth G at the center thereof, and the wall part 15a which is inclined at an almost constant gradient toward the sliding face from the vicinity of the bottom 15b and whose opening is gradually increased. Hereinafter, an opening diameter D of the concave part 15 in the sliding face S is defined as a diameter of an imaginary figure formed by intersection of an extension surface 15c, formed by extending the surface partitioning the wall part 15a, and the sliding face S. The peripheral edge part 11 consists of an outer peripheral edge part 11a which smoothly ranges to the sliding face S on the outside of the opening diameter D of the concave part 15, an inclined wall part 11b which is downwardly inclined toward the center part of the concave part 15 from the outer peripheral edge part 11a, is a convex curved surface toward the opposing sliding face (the interior of the dimple 10), and has a gradient smaller than the wall part 15a, and an inner peripheral edge part 11c in which the inclined wall part 11b and the wall part 15a range. The outer peripheral edge part 11a, the inclined wall part 11b, the inner peripheral edge part 11c and the wall part 15a may be a convex curved surface toward the interior of the dimple 10 as a whole. Moreover, although the bottom 15b of the concave part 15 has a pointed shape, the shape thereof is not limited thereto, and may be a hemisphere surface or a flat surface.

Moreover, the relationship of the depth G of the dimple 10, that is, the depth G of the concave part 15, a radial width E1 of the peripheral edge part 11, and the opening diameter D of the concave part 15 is set to about $0.25 \leq G/D \leq 1$, $0.15 \leq E1/D \leq 0.5$. Moreover, the gradient of the peripheral edge part 11 is set to 1/100 or less. For example, in the dimple 10 of FIG. 3, the opening diameter D, the dimple depth G, and the radial width E1 of the peripheral edge part 11 are formed to be about 36 μm, about 25 μm, and about 8 μm respectively. Particularly, it is desirable that the opening diameter D of the concave part 15, the radial width E1 of the peripheral edge part 11, and the depth G of the concave part 15 are 10 μm to 60 μm, 5 μm to 20 μm, and 5 μm to 50 μm respectively. Moreover, the peripheral edge part 11 of the dimple 10 is formed by the curved surface, and therefore the peripheral edge part 11 can easily form a gradient of about $1/1000$ in the outer peripheral edge part 11a which smoothly ranges to the sliding face S.

The mechanical seal 1 having the dimples 10 thus configured exhibits the following operation and effects.

Figure 4:
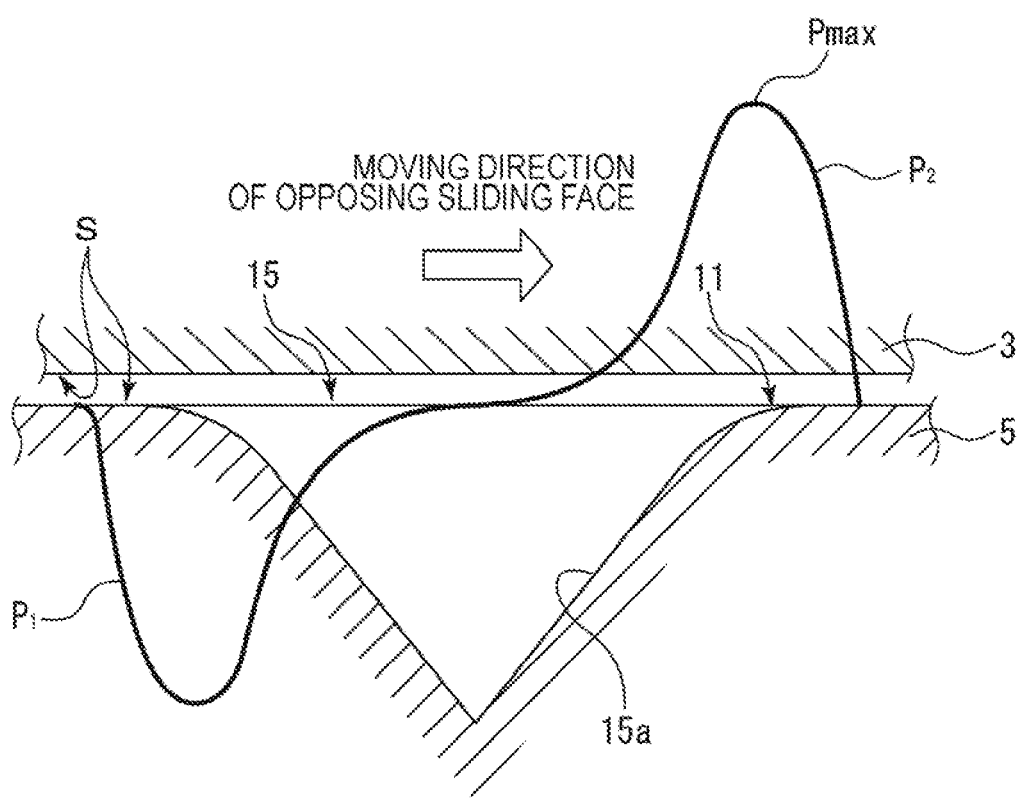
FIG. 4 shows a pressure distribution in the dimple according to the first embodiment of the present invention.

As shown in FIG. 4, when the rotating-side seal ring 3 of the opposing sliding face relatively moves with respect to the stationary-side seal ring 5 in the arrow direction, the fluid between the rotating-side seal ring 3 and the stationary-side seal ring 5, due to viscosity, flows in the arrow direction of FIG. 4, that is, flows from the left side (hereinafter, described as "the upstream side".) to the right side (hereinafter, described as "the downstream side".). As a result, the fluid is suctioned from the sliding face S into the dimple 10 due to viscosity of the fluid, on the upstream side of the dimple 10, a negative pressure P1 is generated, and on the downstream side of the dimple 10, the fluid is increased in pressure due to a wedge effect and a positive pressure P2 is generated. At that time, cavitation is generated in a negative pressure portion on the upstream side of the dimple 10, the cavitation region has a pressure depending on the vapor pressure of the fluid, and therefore the peak of the negative pressure P1 is decreased. As a result, the effect of the positive pressure P2 is dominant in the dimple 10, and a load capability is generated and the sliding face S is lifted. Then, when the sliding face S is lifted, the gap between two sliding faces which relatively slide is increased, the fluid flows in the sliding face S, and a lubrication function is obtained.

Here, the peripheral edge part 11 of the dimple 10 is formed into a very small gradient of $1/100$ or less, and therefore it is possible to constantly form a wedge part between the sliding face S of the rotating-side seal ring 3 and the sliding face S of the stationary-side seal ring 5. Thereby, on the upstream side of the dimple 10, the fluid suctioned into the dimple 10 from the sliding face S efficiently generates a positive pressure in the wedge part of the peripheral edge part 11 on the downstream side, and also can increase a peak Pmax of the positive pressure P2.

Moreover, the radial width E1 is formed to be wide in the range of $0.15 \leq E1/D \leq 0.5$, thereby capable of increasing the area of the region where the high positive pressure P2 is generated, and therefore it is possible to improve the force of lifting the sliding face S, that is, the load capability of the dimple 10. Thereby, even if the sealed fluid is a high pressure fluid having a pressure of 1 MPa or more, for example, about 5 MPa, the sliding face S can certainly obtain a lubrication function.

Further, the depth G of the dimple 10 is formed deeply in the range of $0.25 \leq G/D \leq 1$ with respect to the opening diameter D of the concave part 15, and therefore it is possible to increase the capacity of the concave part 15. Thereby, the fluid suctioned into the dimple 10 is sufficiently stored in the concave part 15, it is possible to stably supply the fluid from the concave part 15 to the positive pressure region of the peripheral edge part 11, and therefore it is possible to exhibit a stable lubrication function without breaking the fluid film.

Besides, if a plurality of dimples 10 which suctions the fluid and discharges the fluid increased in pressure are arranged in the sliding face S, the increased-pressure fluid which is suctioned into the dimples 10 arranged on the inner peripheral side of the sliding face and is discharged therefrom is further repeatedly suctioned into the plurality of dimples 10 arranged on the outer diameter side and is discharged therefrom, the fluid is carried to the outer peripheral part from the inner peripheral part of the sliding face S, and the sliding face S is improved in sealing function as a whole.

As discussed above, the dimple 10 of the present invention is provided with the concave part 15 deeply formed, and, at the outer peripheral part of the concave part 15, the peripheral edge part 11 having a very small gradient and being wide, and therefore it is possible to efficiently enhance the load capability of the dimple 10. Moreover, the plurality of dimples 10 enhanced in load capability are arranged in the sliding face S, thereby capable of enhancing lubrication performance and sealing performance in the sliding component as a whole.

Second Embodiment

Next, the sliding component according to a second embodiment will be described referring to FIG. 1, FIG. 2 and FIG. 5. Whereas the inclined wall part 11b of the peripheral edge part 11 in the first embodiment is formed by a curved surface, an inclined wall part 21b of a peripheral edge part 21 in the second embodiment is different in that it is formed by an inclined surface having a constant gradient. In addition, the same components as the components indicated in the above embodiment are denoted by the same reference signs, and redundant descriptions will be omitted.

Figure 5:
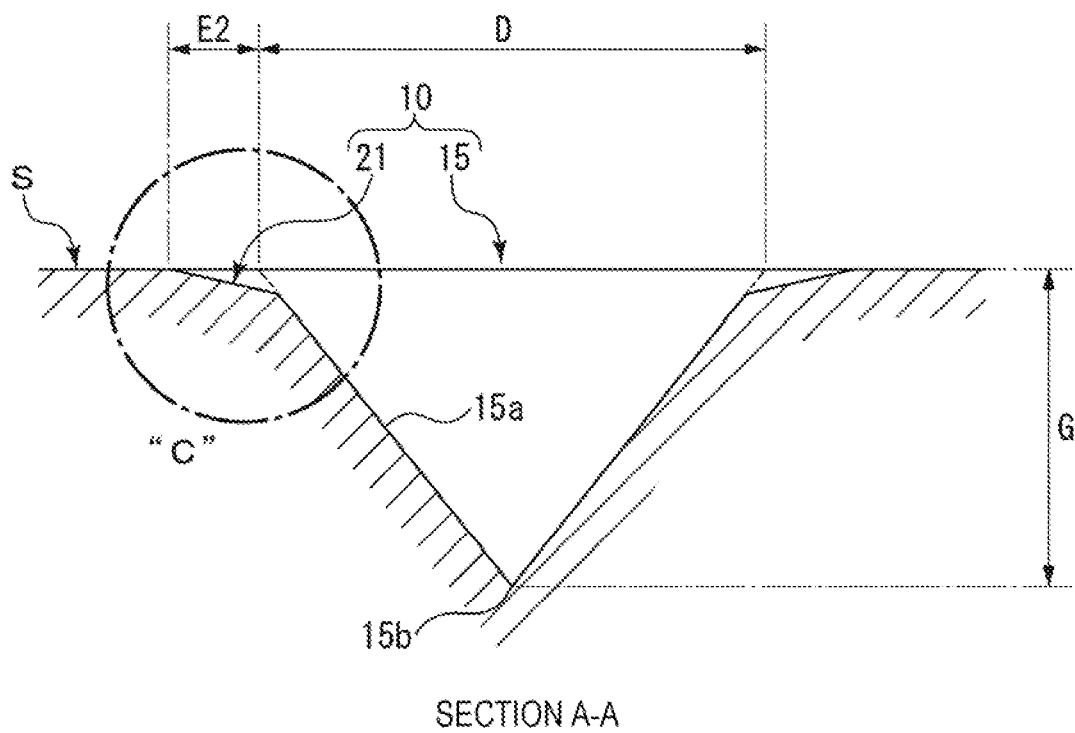
FIG. 5 shows the section A-A in FIG. 2 and shows the sectional shape of the dimple according to a second embodiment of the present invention.
Figure 5:
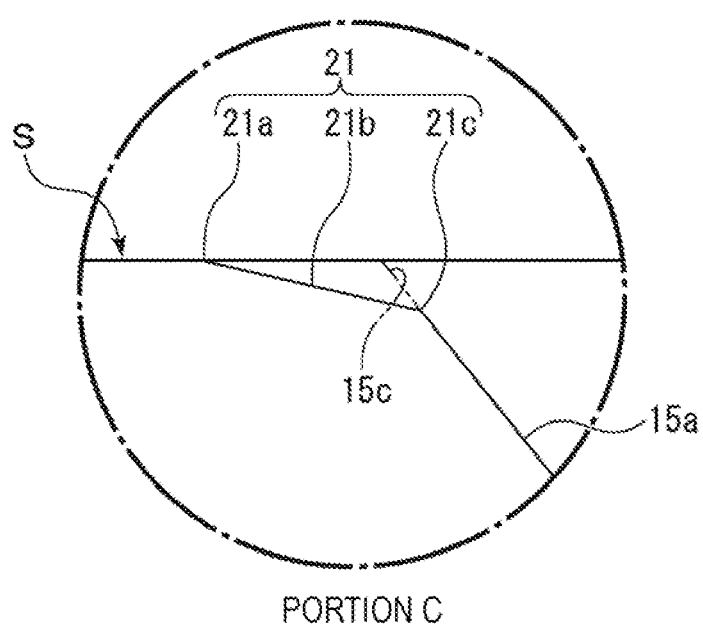

As shown in FIG. 5, the dimple 10 mainly consists of the cone-shaped concave part 15, and the peripheral edge part 21 which ranges to the outer peripheral part of the wall part 15a of the concave part 15 and has a gradient smaller than the wall part 15a. The concave part 15 has the bottom 15b having the depth G at the center part thereof, and the wall part 15a which is inclined at an almost constant gradient toward the sliding face from the vicinity of the bottom 15b and whose opening is gradually increased. Hereinafter, the opening diameter D of the cone-shaped concave part 15 is a diameter of an imaginary figure formed by intersection of the extension surface 15c, formed by extending the surface partitioning the wall part 15a, and the sliding face S. The peripheral edge part 21 consists of an outer peripheral edge part 21a which ranges to the sliding face S on the outside of the opening diameter D of the concave part 15, the inclined wall part 21b which is constantly downwardly inclined toward the center of the concave part 15 from the outer peripheral edge part 21a and has a gradient smaller than the wall part 15a, and an inner peripheral edge part 21c in which the inclined wall part 21b and the wall part 15a range.

Moreover, the relationship of the depth G of the dimple 10, a radial width E2 of the peripheral edge part 21, and the opening diameter D of the concave part 15 is set to about $0.25 \leq G/D \leq 1$, $0.15 \leq E2/D \leq 0.5$. Moreover, the gradient of the peripheral edge part 21 is set to $1/100$ or less. For example, in the dimple 10 of FIG. 5, the opening diameter D, the dimple depth G, and the radial width E2 of the peripheral edge part 21 are formed to be about 36 µm, about 25 µm, and about 8 µm respectively. Particularly, it is desirable that the opening diameter D of the concave part 15, the radial width E2 of the peripheral edge part 21, and the depth G of the concave part 15 are 10 µm to 60 µm, 5 µm to 20 µm, and 5 µm to 50 µm respectively.

As with the first embodiment, the peripheral edge part 21 of the dimple 10 is formed into a very small gradient of $1/100$ or less, and therefore it is possible to constantly forma wedge part between the sliding face S of the rotating-side seal ring 3 and the sliding face S of the stationary-side seal ring 5. Thereby, on the downstream side of the dimple 10, the fluid suctioned into the dimple 10 from the sliding face S efficiently generates a positive pressure in the wedge part of the peripheral edge part 21 on the downstream side, and also can increase the peak Pmax of the positive pressure P2.

Moreover, the radial width E2 is formed to be wide in the range of $0.15 \leq E2/D \leq 0.5$, thereby capable of increasing the area of the region where the high positive pressure P2 is generated, and therefore it is possible to improve the load capability of the dimple 10.

Further, the depth G of the dimple 10 is formed deeply in the range of $0.25 \leq G/D \leq 1$ with respect to the opening diameter D of the concave part 15, and therefore it is possible to increase the capacity of the concave part 15. Thereby, the fluid suctioned into the dimple 10 is sufficiently stored in the concave part 15, it is possible to stably supply the fluid from the concave part 15 to the positive pressure region of the peripheral edge part 21, and therefore it is possible to exhibit stable lubrication performance without breaking the fluid film.

As discussed above, also in the second embodiment, the dimple 10 is provided with the concave part 15 deeply formed, and, at the outer peripheral part of the concave part 15, the peripheral edge part 21 having a very small gradient and being wide, and therefore it is possible to efficiently enhance the load capability of the dimple 10. Moreover, the plurality of dimples 10 enhanced in load capability are arranged in the sliding face S, thereby capable of enhancing lubrication performance and sealing performance in the sliding component as a whole.

Figure 7:
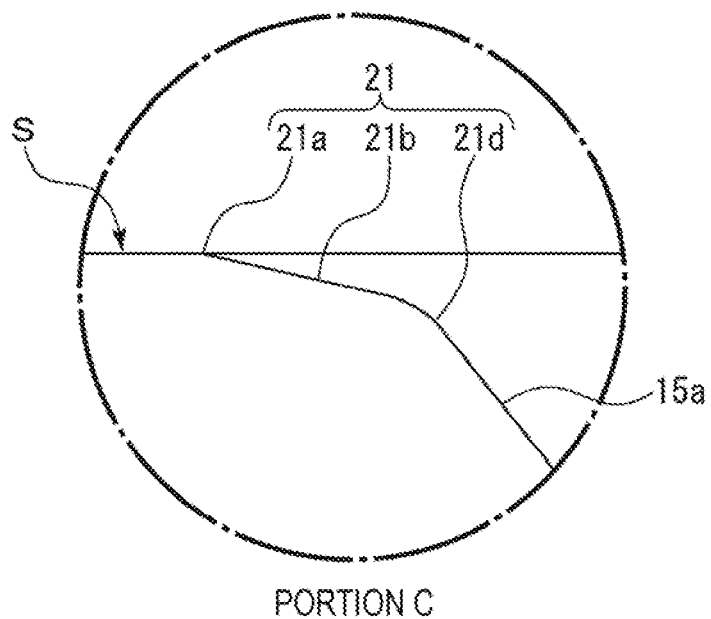
FIG. 7A shows a modification of a portion C in FIG. 5.
FIG. 7B shows a modification of a portion D in FIG. 6.
Figure 7:
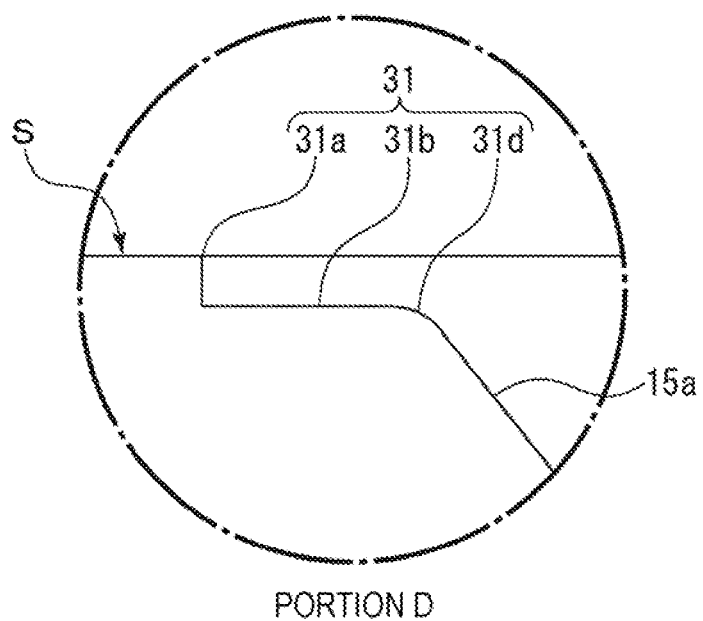

In addition, in FIG. 5, the inclined wall part 21b of the peripheral edge part 21 is an inclined surface having a constant gradient, but is not limited thereto. For example, as shown in FIG. 7A, an inner peripheral edge part 21d in which the inclined wall part 21b and the wall part 15a range may be a curved surface, thereby capable of reducing inflow resistance when the fluid flows in the wedge part. Thereby, high pressure is more efficiently generated in the peripheral edge part 21 of the dimple 10, and it is possible to increase the load capacity of the dimple 10.

Third Embodiment

Next, the sliding component according to a third embodiment will be described referring to FIG. 1, FIG. 2 and FIG. 6. Whereas the inclined wall part 11b of the peripheral edge part 11 in the first embodiment is formed by a curved surface and the inclined wall part 21b of a peripheral edge part 21 in the second embodiment is formed by an inclined surface having a constant gradient, a bottom wall 31b of a peripheral edge part 31 in the third embodiment is different in that it has a bottom having a constant depth. In addition, the same components as the components indicated in the above embodiment are denoted by the same reference signs, and redundant descriptions will be omitted.

Figure 6:
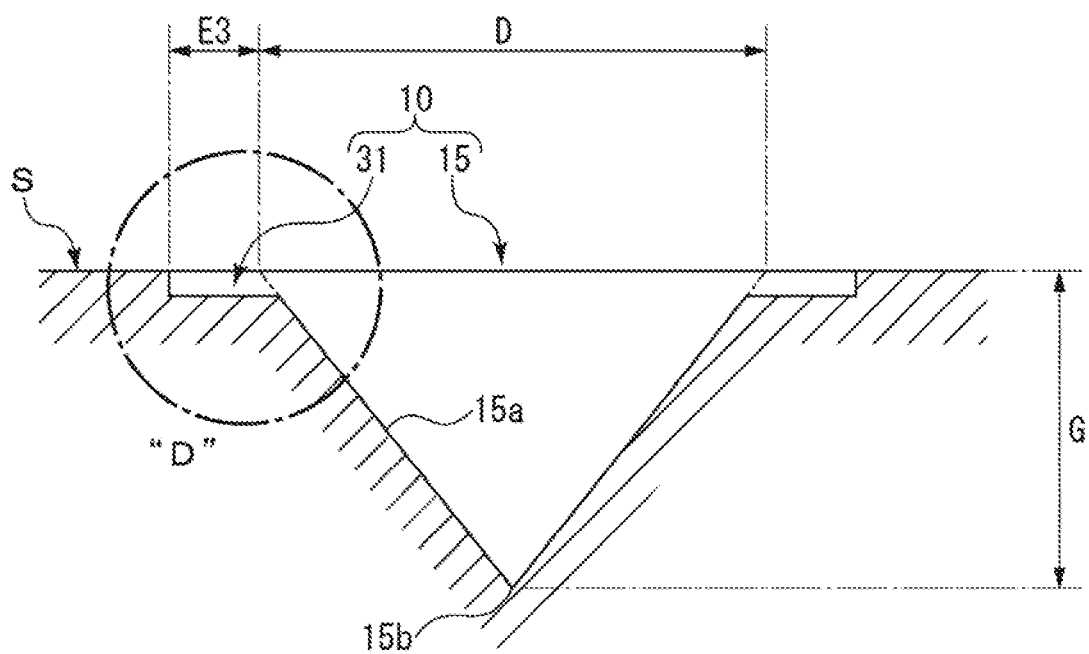
FIG. 6 shows the section A-A in FIG. 2 and shows the sectional shape of the dimple according to a third embodiment of the present invention.
Figure 6:
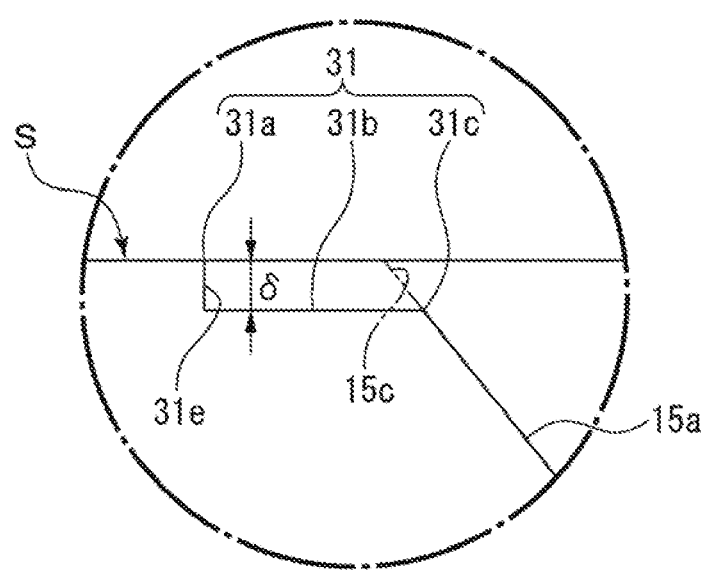

As shown in FIG. 6, the dimple 10 mainly consists of the cone-shaped concave part 15, and the peripheral edge part 31 which has a dent shallower than the concave part 15 on the outside of the wall part 15a of the concave part 15. As with the first embodiment and the second embodiment, the concave part 15 has the bottom 15b having the depth G at the center part thereof, and the wall part 15a which is inclined at an almost constant gradient toward the sliding face from the vicinity of the bottom 15b and whose opening is gradually increased. Hereinafter, the opening diameter D of the con-shaped concave part 15 is defined as a diameter of an imaginary figure formed by intersection of the extension surface 15c, formed by extending the surface partitioning the wall part 15a, and the sliding face S. The peripheral edge part 31 consists of an outer peripheral edge part 31a which ranges to the sliding face S on the outside of the opening diameter D of the concave part 15, a peripheral wall 31e provided in a standing manner in the outer peripheral edge part 31a, a bottom wall 31b which ranges to the peripheral wall 31e and has a constant depth δ, and an inner peripheral edge part 31c in which the bottom wall 31b and the wall part 15a range.

Moreover, the relationship of the depth G of the dimple 10 (the depth G of the concave part 15), a radial width E3 of the peripheral edge part 31, and the opening diameter D of the concave part 15 is set to about $0.25 \leq G/D \leq 1$, $0.15 \leq E3/D \leq 0.5$. For example, in the dimple 10 of FIG. 6, the opening diameter D, the dimple depth G, and the radial width E3 of the peripheral edge part 31 are formed to be about 36 μm, about 25 μm, and about 8 μm respectively. Particularly, it is desirable that the opening diameter D of the concave part 15, the radial width E3 of the peripheral edge part 31, the depth G of the concave part 15, and the depth δ of the bottom wall 31b of the peripheral edge part 31 are 10 μm to 60 μm, 5 μm to 20 μm, 5 μm to 50 μm, and 1 μm to 5 μm respectively.

The bottom wall 31b of the peripheral edge part 31 of the dimple 10 has the constant depth δ, and therefore on the upstream side of the dimple 10, the bottom wall 31b functions as a reverse Rayleigh step, generates a negative pressure, and suctions the fluid with low loss into the dimple 10 from the sliding face S, and on the downstream side, the bottom wall 31b functions as a Rayleigh step and can generate a positive pressure.

Moreover, the radial width E3 is formed to be wide in the range of $0.15 \leq E3/D \leq 0.5$, thereby capable of increasing the area of the region where the positive pressure is generated, and therefore it is possible to improve the load capability of the dimple 10.

Further, the depth G of the dimple 10 is formed deeply in the range of $0.25 \leq G/D \leq 1$ with respect to the opening diameter D of the concave part 15, and therefore it is possible to increase the capacity of the concave part 15. Thereby, the fluid suctioned into the dimple 10 is sufficiently stored in the concave part 15, it is possible to stably supply the fluid from the concave part 15 to the positive pressure region of the peripheral edge part 31, and therefore it is possible to exhibit stable lubrication performance without breaking the fluid film.

As thus described, the peripheral edge part 31 in the third embodiment has the bottom wall 31b having the constant depth δ, and therefore it is possible to easily manufacture it, and efficiently enhance the load capability of the dimple 10. Moreover, the plurality of dimples 10 enhanced in load capability are arranged in the sliding face S, thereby capable of enhancing lubrication performance and sealing performance in the sliding component as a whole.

In addition, in FIG. 6, the bottom wall 31b of the peripheral edge part 31 has a constant depth, but is not limited thereto. For example, as shown in FIG. 7B, an inner peripheral edge part 31d in which the bottom wall part 31b and the wall part 15a range may be a curved surface, thereby capable of reducing inflow resistance when the fluid flows in the Rayleigh step. Thereby, high pressure is more efficiently generated in the peripheral edge part 31 of the dimple 10, and it is possible to increase the load capacity of the dimple 10.

Hereinbefore, although the embodiments of the present invention have been described by the drawings, its specific configuration is not limited to these embodiments, and any changes and additions made without departing from the scope of the present invention are included in the present invention.

For example, in the above embodiment, the dimples 10 are provided in the whole surface of the sliding face S, but the present invention is not limited thereto. For example, an island shaped dimple group is formed by surrounding the plurality of dimples 10 by the sliding face S, and the island shaped dimple group is arranged in a portion of the sliding face where the load is high, thereby sealing performance and lubrication performance may be improved. Moreover, the island-shaped dimple group is communicated with the low pressure fluid side, and the suction amount from the low pressure fluid side is increased, thereby sealing performance may be further improved, or the island-shaped dimple group is communicated with the high pressure fluid side, and the fluid supply amount from the high pressure fluid side is increased, thereby lubrication performance may be further improved. Further, the island-shaped dimple group is communicated with the low pressure fluid side and the high pressure fluid side, thereby sealing performance and lubrication performance may be further improved.

In the first embodiment to the third embodiment, although an example where the sliding component is used for at least either one of a pair of rotating-side seal ring and stationary-side seal ring in a mechanical seal device has been described, the sliding component can also be used as a sliding component of a bearing which slides with a rotating shaft while sealing a lubricating oil on an axial one side of a cylindrical sliding face.

Moreover, in the first embodiment to the third embodiment, although the outer peripheral side of the sliding component has been described as the high pressure fluid side (the sealed fluid side) and the inner peripheral side has been described as the low pressure fluid side (the leakage side), the present invention is not limited thereto, and is also applicable to a case where the outer peripheral side is the low pressure fluid side (the leakage side) and the inner peripheral side is the high pressure fluid side (the sealed fluid side).

REFERENCE SIGNS LIST 1 mechanical seal
2 sleeve
3 rotating-side seal ring
4 housing
5 stationary-side seal ring
6 coiled wave spring
7 bellows
9 rotating shaft
10 dimple
11 peripheral edge part
11a outer peripheral edge part
11b inclined wall part
11c inner peripheral edge part
15 concave part
15a wall part
15b bottom
15c extension surface
21 peripheral edge part
21a outer peripheral edge part
21b inclined wall part
21c inner peripheral edge part
21d inner peripheral edge part
31 peripheral edge part
31a outer peripheral edge part
31b bottom wall
31c inner peripheral edge part
31e peripheral wall
D opening diameter of concave part in sliding face
E1 radial width of peripheral edge part
E2 radial width of peripheral edge part
E3 radial width of peripheral edge part
S sliding face

The invention claimed is:

1. A pair of sliding components having respective sliding faces which slide relative to each other, characterized in that:
   at least one of the sliding faces is provided with a plurality of dimples; and
   each dimple is constituted by a cone-shaped concave part and a peripheral edge part, wherein
   the cone-shaped concave part is constituted by:
   a bottom having a given depth at a center of the cone-shaped concave part with reference to the at least one of the sliding faces, and
   a cone-shaped wall part inclined at a substantially constant gradient from a vicinity of the bottom toward the at least one of the sliding faces in a manner gradually increasing an opening diameter toward the at least one of the sliding faces, and
   the peripheral edge part is constituted by:
   an outer peripheral edge part where the peripheral edge part connects the at least one of the sliding faces, wherein the outer peripheral edge part is disposed outside of the opening diameter of the cone-shaped wall part on a plane of the at least one of the sliding faces, wherein the opening diameter is defined if the cone-shaped wall part extends to the plane and intersects the plane,
   a peripheral wall provided, at the outer peripheral edge part, substantially perpendicular to the at least one of the sliding faces, and
   a bottom wall connecting the peripheral wall and the cone-shaped wall part and having a substantially constant depth with reference to the at least one of the sliding faces.

2. The sliding component according to claim 1, characterized in that the peripheral wall of the peripheral edge part is constituted by a Rayleigh step or a reverse Rayleigh step.

3. The sliding component according to claim 2, characterized in that when the depth of the concave part is G and the opening diameter of the concave part in the sliding face is D, a ratio G/D of the depth and the opening diameter is 0.25 to 1.

4. The sliding component according to claim 1, characterized in that when the depth of the concave part is G and the opening diameter of the concave part in the sliding face is D, a ratio G/D of the depth and the opening diameter is 0.25 to 1.

5. The sliding component according to claim 4, characterized in that when the width of the peripheral edge part is E, a ratio E/D of the width and the opening diameter is 0.15 to 0.5.

6. The sliding component according to claim 5, characterized in that the width E of the peripheral edge part is 5 µm to 20 µm.

7. The sliding component according to claim 6, characterized in that the depth G of the concave part is 5 µm to 50 µm.

8. The sliding component according to claim 5, characterized in that the opening diameter D is 10 µm to 60 µm, the width E is 5 µm to 20 µm, and the depth G is 5 µm to 50 µm.

9. The sliding component according to claim 5, characterized in that the depth G of the concave part is 5 µm to 50 µm.

10. The sliding component according to claim 4, characterized in that the depth G of the concave part is 5 µm to 50 µm.

11. The sliding component according to claim 10, characterized in that the width E of the peripheral edge part is 5 μm to 20 μm.

12. The sliding component according to claim 1, wherein an inner peripheral edge part is provided where the bottom wall part and the cone-shaped wall part meet, wherein the inner peripheral edge part is constituted by a curved surface as viewed in a cross section.

13. The sliding component according to claim 1, wherein the depth of the bottom wall of the peripheral edge part is 1 μm to 5 μm.

* * * * *